United States Patent
Hirmer et al.

(10) Patent No.: US 11,135,593 B2
(45) Date of Patent: Oct. 5, 2021

(54) CAPILLARY CONNECTION UNIT FOR ANALYSIS DEVICES AND MEDICAL DEVICES

(71) Applicant: Möller Medical GmbH, Fulda (DE)

(72) Inventors: Frank Hirmer, Schlitz (DE); Michael Frank, Grossenlüder (DE)

(73) Assignee: Möller Medical GmbH

( * ) Notice: Subject to any disclaimer, the term of this patent is extended or adjusted under 35 U.S.C. 154(b) by 288 days.

(21) Appl. No.: 16/300,369

(22) PCT Filed: May 12, 2017

(86) PCT No.: PCT/EP2017/000584
§ 371 (c)(1),
(2) Date: Nov. 9, 2018

(87) PCT Pub. No.: WO2017/194193
PCT Pub. Date: Nov. 16, 2017

(65) Prior Publication Data
US 2019/0091693 A1    Mar. 28, 2019

(30) Foreign Application Priority Data

May 12, 2016 (EP) ..................................... 16001083

(51) Int. Cl.
*B01L 3/00* (2006.01)
*F16L 15/04* (2006.01)
*G01N 30/60* (2006.01)

(52) U.S. Cl.
CPC .............. *B01L 3/563* (2013.01); *F16L 15/04* (2013.01); *G01N 30/6026* (2013.01); *B01L 2200/0689* (2013.01); *B01L 2300/0838* (2013.01)

(58) Field of Classification Search
CPC ............. B01L 3/563; B01L 2200/0689; B01L 2300/0838; G01N 30/6026; F16L 15/04
See application file for complete search history.

(56) References Cited

U.S. PATENT DOCUMENTS

| 5,669,637 | A | 9/1997 | Chitty et al. |
| 9,347,056 | B2 * | 5/2016 | Saito .................. G01N 30/6069 |

(Continued)

FOREIGN PATENT DOCUMENTS

| DE | 102009022368 B3 | 11/2010 |
| DE | 102011050037 B3 | 6/2012 |

(Continued)

*Primary Examiner* — Matthew D Krcha
*Assistant Examiner* — Sophia Y Lyle
(74) *Attorney, Agent, or Firm* — Endurance Law Group PLC

(57) ABSTRACT

A capillary connection unit for analysis devices and medical devices includes a capillary having at least one end section and a free end, at least one connection element arranged on the end section of the capillary, wherein the connection element has an axial guide-through for the capillary, a sealing element surrounding the capillary, and a metal sleeve element which radially externally surrounds the sealing element and which has a first end facing the connection element and a receiving region facing away from the connection element, wherein the connection element is configured to be detachably connected to a counter element and to exert an axial thrust force onto the sealing element.

13 Claims, 8 Drawing Sheets

(56) References Cited

U.S. PATENT DOCUMENTS 9,562,879 B2 * 2/2017 Hirmer .................. F16L 19/00
10,655,761 B2 * 5/2020 Graham .................. B01L 3/563

FOREIGN PATENT DOCUMENTS

| DE | 102011082470 A1 * | 3/2013 | ......... G01N 30/6026 |
| GB | 2482175 A | 1/2012 | |
| WO | 2013024345 A1 | 2/2013 | |

* cited by examiner

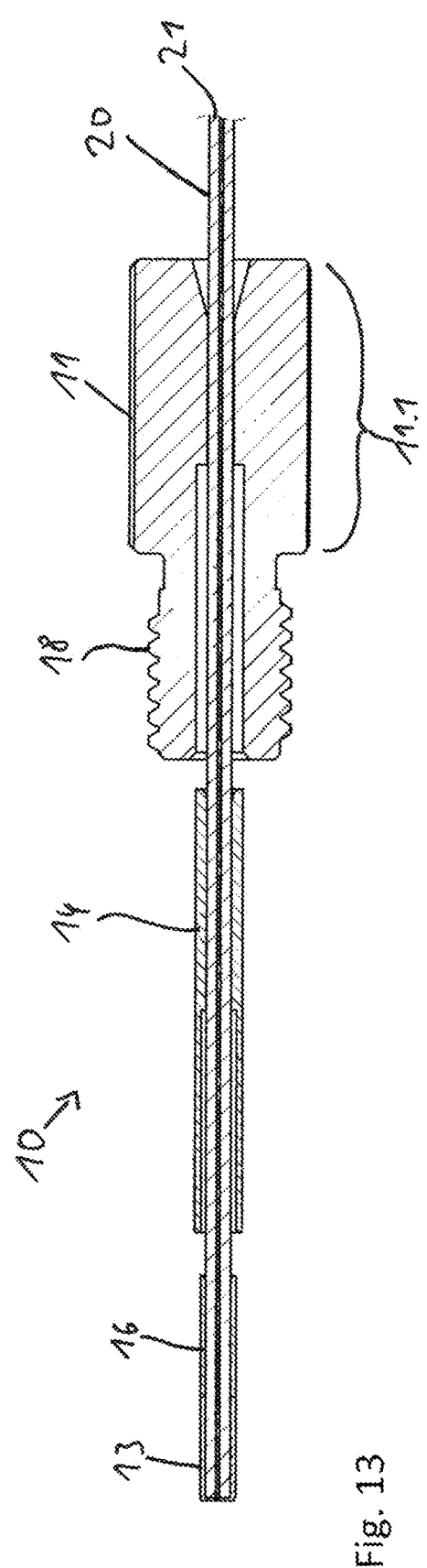
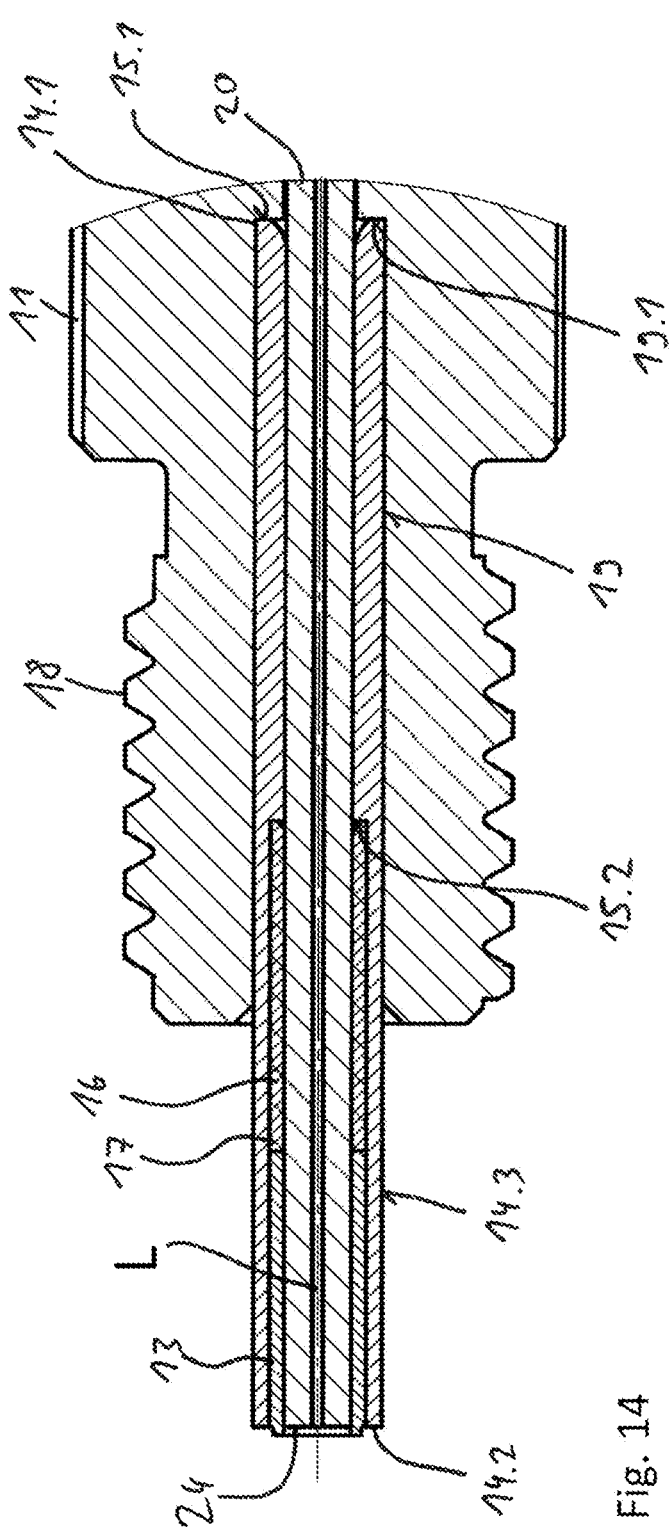
Fig. 13
Fig. 14

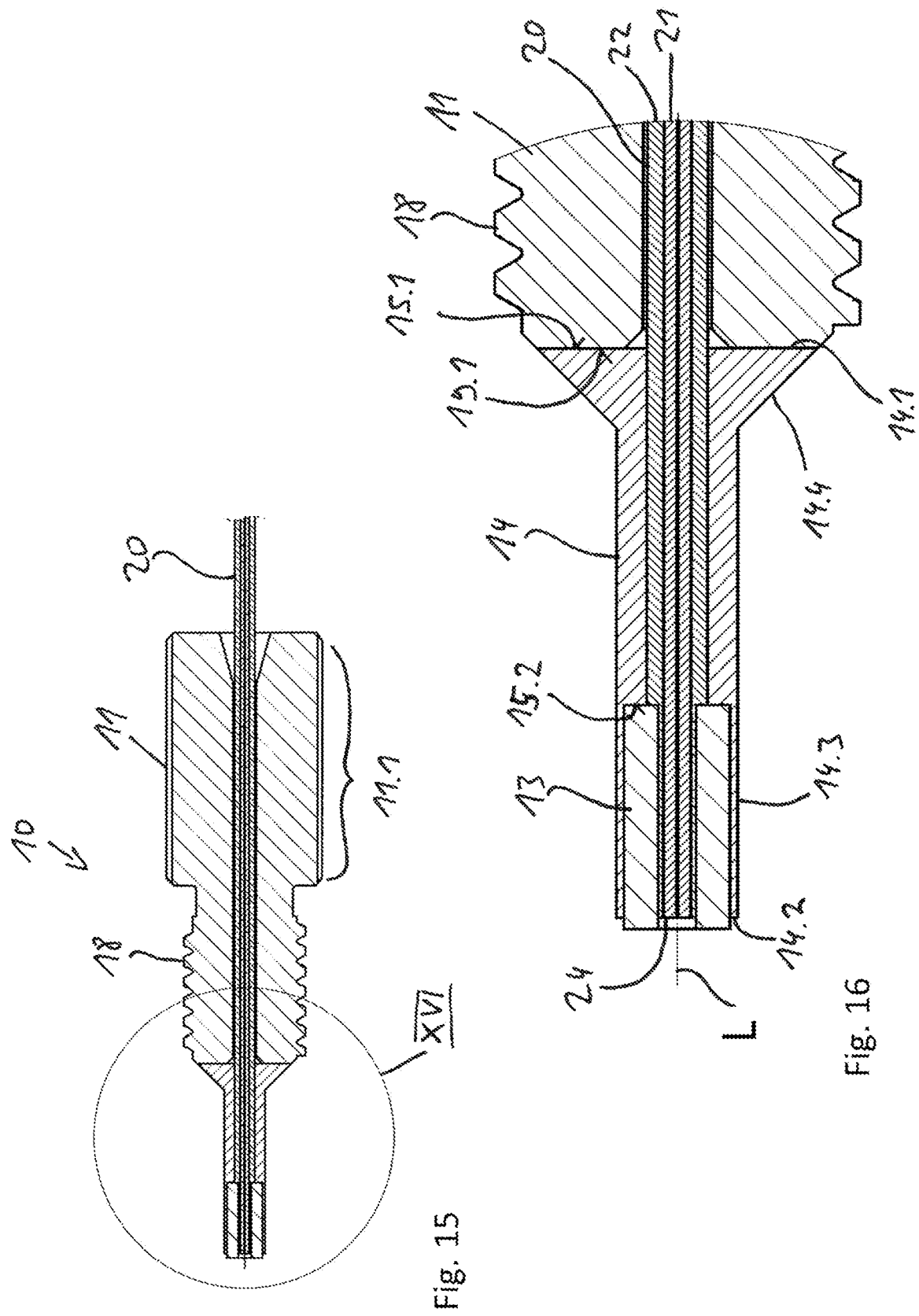

CAPILLARY CONNECTION UNIT FOR ANALYSIS DEVICES AND MEDICAL DEVICES

CROSS-REFERENCE TO RELATED APPLICATIONS

This application is the U.S. national stage of PCT/EP2017/000584 filed May 12, 2017, which claims priority of European Patent Application 16001083.1 filed May 12, 2016 each of which is hereby incorporated by reference in its entirety.

FIELD OF INVENTION

The invention relates in particular to a capillary connection unit for analysis devices and medical devices.

BACKGROUND OF THE INVENTION

Capillary connections for analysis devices and medical devices generally consist of a plug connection between a capillary connection element and a counter element having a receiving space for inserting one end of the capillary connection element. The elements are preferably designed as so-called "fittings", which can be screwed together. A sealing element is provided at the insertion-side end of the capillary connection element and is intended to seal the connection between the capillary connection element and the counter element or the capillary connection plug and the counter plug in the region of the capillary openings located opposite one another, even at higher pressures. By screwing the capillary connection element and the counter element together, the sealing element can be pressed with high contact pressure onto a wall of the counter element opposite thereto.

DE 10 2009 022 368 B3 discloses a plug unit for connecting capillaries, in particular for high-performance liquid chromatography, with a plug housing which has an axial bore, with a plug capillary which extends through the axial bore of the plug housing, and with a sealing element which is annular in cross-section and surrounds the plug capillary and that the front end of the plug capillary is sealed against the capillary receiving opening of the socket unit by elastic and/or plastic deformation of the sealing element. The plug housing is designed such that it can be detachably connected to a socket unit, wherein the front end of the plug capillary projects into a capillary receiving opening of the socket unit in the connected state of the plug unit and the socket unit and, with its end face, is substantially located opposite and aligned to a front end of a socket capillary or a socket capillary opening of the socket unit. In the connected state of the plug unit and the socket unit, an axial contact pressure is to be applied indirectly or directly to the sealing element. DE 10 2009 022 368 B3 further provides a hollow cylindrical pressure piece designed as a sleeve, which surrounds the sealing element in an axial region facing away from the end face of the plug capillary. The pressure piece has a rear end face which faces away from the end face of the plug capillary and to which an axial compressive force can be applied by the plug housing in the connected state of the plug unit and the socket unit. The pressure piece and the sealing element are firmly connected to the plug capillary, so that the axial compressive force can be transmitted to the end face of the sealing element without a relative movement occurring between the pressure piece and the sealing element on the one hand and the plug capillary on the other hand. In this system, the sealing element made of PEEK (polyether ether ketone) must be able to expand circumferentially in the sealing area by some tenths of a millimeter in order to achieve tightness. As a result of the flowability of the PEEK material under pressure, this connection must be retightened on a regular basis, since the circumferential tightness decreases otherwise.

SUMMARY OF THE INVENTION

Starting from this prior art, the object of the invention is to provide a capillary connection unit which enables an improved, safe and low-maintenance application and good tightness even in high-pressure applications. Furthermore, it is desirable to prevent the sealing element from escaping into dead spaces (tolerance fields of the sealing area) and from being squeezed into the capillary channel or the capillary channel from being reduced.

This object is achieved by a capillary connection unit according to claim 1. Advantageous embodiments of the capillary connection unit according to the invention are the subject-matter of the further claims and arise from the following description of the invention.

According to the invention, the sleeve element is guided axially movably with the sealing element both in relation to the connection element and in relation to the capillary, wherein an inner diameter $d_{iH}$ of the sleeve element in the receiving region facing away from the connection element is at least as large as the outer diameter d of the sealing element, and wherein the sleeve element is configured to accommodate the sealing element substantially entirely in the receiving region thereof, and wherein the sleeve element has a first thrust surface facing the connection element in the axial direction for receiving the thrust force of the connection element on its first end facing the connection element and only one radially internal second thrust surface facing the sealing element and axially spaced from the end facing away from the connection element for transferring the thrust force onward to the sealing element. The thrust surface preferably lies completely in a plane which perpendicularly intersects the longitudinal axis of the sleeve element.

The design of the capillary connection unit according to the invention firstly enables a high thrust force to be exerted on the sealing element without it being able to escape radially outwardly, since it is surrounded by the sleeve element. As a result of the compression during tightening of the connection element and the counter element, the sealing element is thus above all pressed radially inwardly against the capillary and radially outwardly against the sleeve element, whereby an optimal seal is achieved which avoids dead spaces and sealing space tolerance fields. Due to the relative movability of the sleeve element in relation to the sealing element, this material displacement of the sealing element can be distributed over a large area in the region of its outer lateral surface. The metal sleeve element also assumes a sealing function by being able to be placed with its free end face up against a sealing surface in the counter element.

At the same time, after release of the connection between the connection element and the counter element, it is possible to push the sleeve element off the sealing element in order to inspect the sealing element for possible cracks. Damaged seals and thus no longer usable capillary connection units can thus be easily detected and discarded.

In an advantageous development of the invention, the sealing element is firmly connected to the capillary in a bonded or material manner, whereby an optimal seal with the capillary is achieved.

Advantageously, the sealing element is composed of at least one material of the group comprising fluoroplastics, polyaryl ether ketones (PAEK), mixtures of fluoroplastics and polyaryl ether ketones (PAEK), in particular selected from the group comprising polytetrafluoroethylene (PTFE), polyvinylidene fluoride (PVDF), polyether ketone (PEK), polyether ether ketone (PEEK), polyether ketone ketone (PEKK), polyether ether ether ketone (PEEEK), polyether ketone ether ketone ketone (PEKEKK), and polyether ether ketone ether ketone (PEEKEK). In this case, several materials of the group can be combined, e.g., by forming the sealing element in layers, wherein a material that is particularly flowable under pressure is, for example, used radially externally and internally and a less flowable material is used in a core region of the sealing element. Polyether ketone (PEK), polyether ether ketone (PEEK) and polyether ketone ketone (PEKK) are preferably used, with polyether ether ketone (PEEK) being most preferred. The sealing element made of PEEK or another aforementioned material may, for example, be injection-molded onto the capillary.

In a favorable embodiment of the invention, the second thrust surface of the sleeve element is designed as an annular surface, wherein a cross-section radius $r_{QS}=r_S-r_{i,min}$ of the second thrust surface (15.2) and a maximum cross-section radius $r_{QH}=r_H-r_{i,min}$ of the sleeve element (14) must be at least in the ratio $r_{QH}:r_{QS}$ of 1.5:1 and where $r_{i,min}$ is the minimum inner radius of the sleeve element, $r_S$ is the outer radius of the second thrust surface, and $r_H$ is the outer radius of the sleeve element. This ensures good thrust transmission from the sleeve element to the sealing element. Preferably, the ratio $r_{QH}:r_{QS}$ is in the range of 1.5:1 to 1.75:1.

It is further advantageous if the capillary is designed to be multi-shelled, or formed from a plurality of concentric layers, preferably two-shelled, or formed from two concentric layers, at least in the end section of the capillary. This design of the capillary allows the material properties of two or more materials to be combined with one another in the capillary. For example, an inner layer or shell of the capillary could consist of a diffusion-resistant but optionally less elastic material, with a second outer shell or layer being formed from a more elastic material.

An inner shell of the capillary is advantageously formed from a material from the group comprising glass, in particular fused silica, thermoplastic material, such as PEEK, metal and ceramic. Full or partial ceramics can be used as ceramic. The ceramic may consist of one or more materials selected from the group comprising carbides, nitrides and/or oxides (or others), or be a ceramic of one or more elements selected from the group consisting of boron, aluminum, silicon, germanium, zirconium, cerium, rare earths (or others). The ceramic material is preferably selected from the group consisting of silicon carbide, silicon nitride, silicon oxide, zirconium oxide, zirconium carbide, titanium oxide, aluminum oxide, titanium carbide and composites and/or mixtures thereof. An outer shell is formed, for example, from a material from the group comprising thermoplastic material, such as PEEK, metal, in particular stainless steel or titanium. Considered as thermoplastic material of the inner shell and the outer shell are fluoroplastics, polyaryl ether ketones (PAEK), mixtures of fluoroplastics and polyaryl ether ketones (PAEK), in particular selected from the group comprising polytetrafluoroethylene (PTFE), polyvinylidene fluoride (PVDF), polyether ketone (PEK), polyether ether ketone (PEEK), polyether ketone ketone (PEKK), polyether ether ether ketone (PEEEK), polyether ketone ether ketone ketone (PEKEKK), and polyether ether ketone ether ketone (PEEKEK).

Fused silica is understood to mean silica glass (pure silicon dioxide) which is obtained by melting quartz (crystalline silicon dioxide) at temperatures above 1705° C. with subsequent cooling.

Preferably, the capillary has a substantially constant inner diameter, for example, over its entire length but at least in the end section of the capillary. The inner diameter of the capillary is preferably not narrowed, at least in the region of the end section of the capillary, in particular in the multi-shelled (e.g., two-shelled) design of the capillary or of its end section. The capillary connection unit preferably has no components that narrow the inner diameter of the capillary (or the flow space), e.g., in the region of the end section of the capillary. It is also preferred that the capillary, in particular in the region of the at least one end section, does not have any constrictions of its inner diameter, e.g., from protrusions or protuberances (of the capillary walls) or inserts.

It is further preferred that the capillary connection unit does not comprise any (tubular) capillary insert having an annular end (at the end of the capillary). In other words, the capillary connection unit preferably does not have any (tubular) capillary insert, in particular any (tubular) capillary insert having an annular end (at the end of the capillary). Capillary inserts of this type serve in particular to close off the capillary end. As a rule, such capillary inserts are introduced at least partially (e.g. with its "stem" (tube)) into the capillary, whereby a narrowing of the flow space results, for example. Such capillary inserts are known, for example, from U.S. Pat. No. 5,669,637. In this sense, the capillary end of the capillary connection unit according to the invention is particularly preferably designed "integrally" (i.e., without additional "end cap," such as a (tubular) capillary insert having an annular end).

In a favorable development of the invention, a stationary securing element is arranged radially externally on the capillary in a region directly adjacent to the sealing element to the connection element and is connected to the capillary in a material or bonded manner and is connected to the sealing element via a toothed feature in a material or bonded and form-fitting manner. The securing element prevents the sealing element from twisting off the capillary in the event of rotational forces acting on the sealing element.

The stationary securing element is advantageously made of a metal, in particular a steel. Further advantageously, the securing element is annular or sleeve-shaped and encloses the capillary in regions. As a result of this design, the securing element has a high strength and thrust forces can be evenly absorbed by the securing element as a result of the annular shape.

Further advantageously, the radially internal second thrust surface of the sleeve element can interact via the stationary sleeve element in a mediated manner with the sealing element in order to transmit the thrust force of the connection element. This means that the thrust force is transmitted by means of the securing element to the sealing element. In an embodiment of the securing element and of the sleeve element made of metal, in particular of steel or stainless steel, the thrust force is transmitted between two elements of substantially equal strength, whereby force transmission is optimized.

The connection element can be designed as a (solid) HPLC fitting element or as a torque fitting or as a fitting with an overload coupling. The fitting is preferably a fitting with the character of a ratchet and thus with a ratchet-like function.

In a further advantageous embodiment of the invention, the connection element is guided movably to a limited extent on the capillary, the movability of the connection element on the capillary being limited by a stop element connected fixedly to the capillary, thereby facilitating the handling of the capillary connection unit.

BRIEF DESCRIPTION OF THE DRAWINGS

FIG. 13: another capillary connection unit in longitudinal section with its components moved relatively to each other;
FIG. 14: the capillary connection unit from FIG. 13 in longitudinal section;
FIG. 15: a further capillary connection unit according to the invention in longitudinal section;
FIG. 16: a detailed view of the capillary connection unit according to marking XVI from FIG. 15.

DETAILED DESCRIPTION OF THE DRAWINGS

Figure 1:
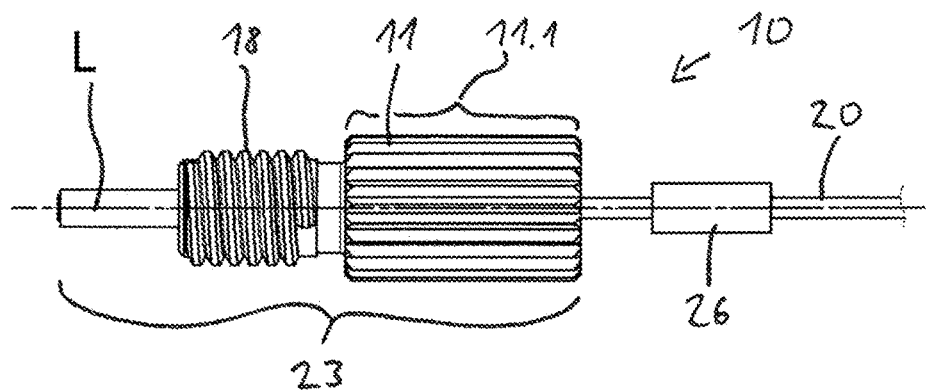
FIG. 1: a capillary connection unit according to the invention.
Figure 2:
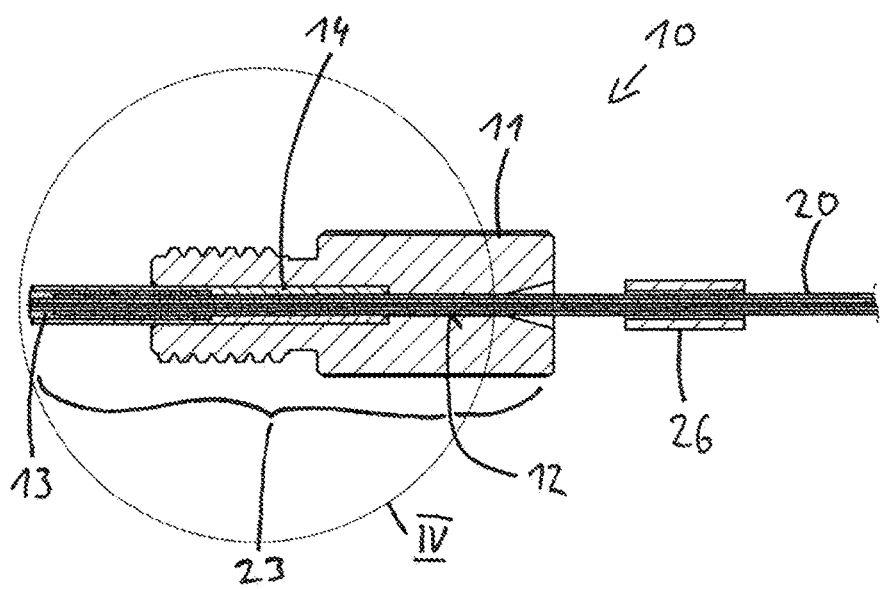
FIG. 2: the capillary connection unit from FIG. 1 in longitudinal section.
Figure 3:
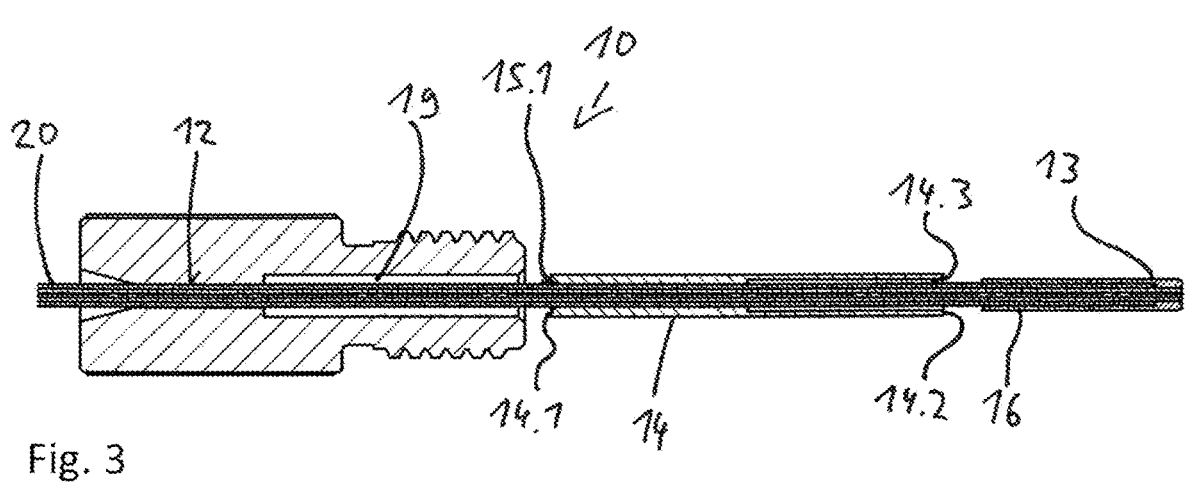
FIG. 3: the capillary connection unit from FIG. 1 in longitudinal section with its components moved relatively to each other.
Figure 4:
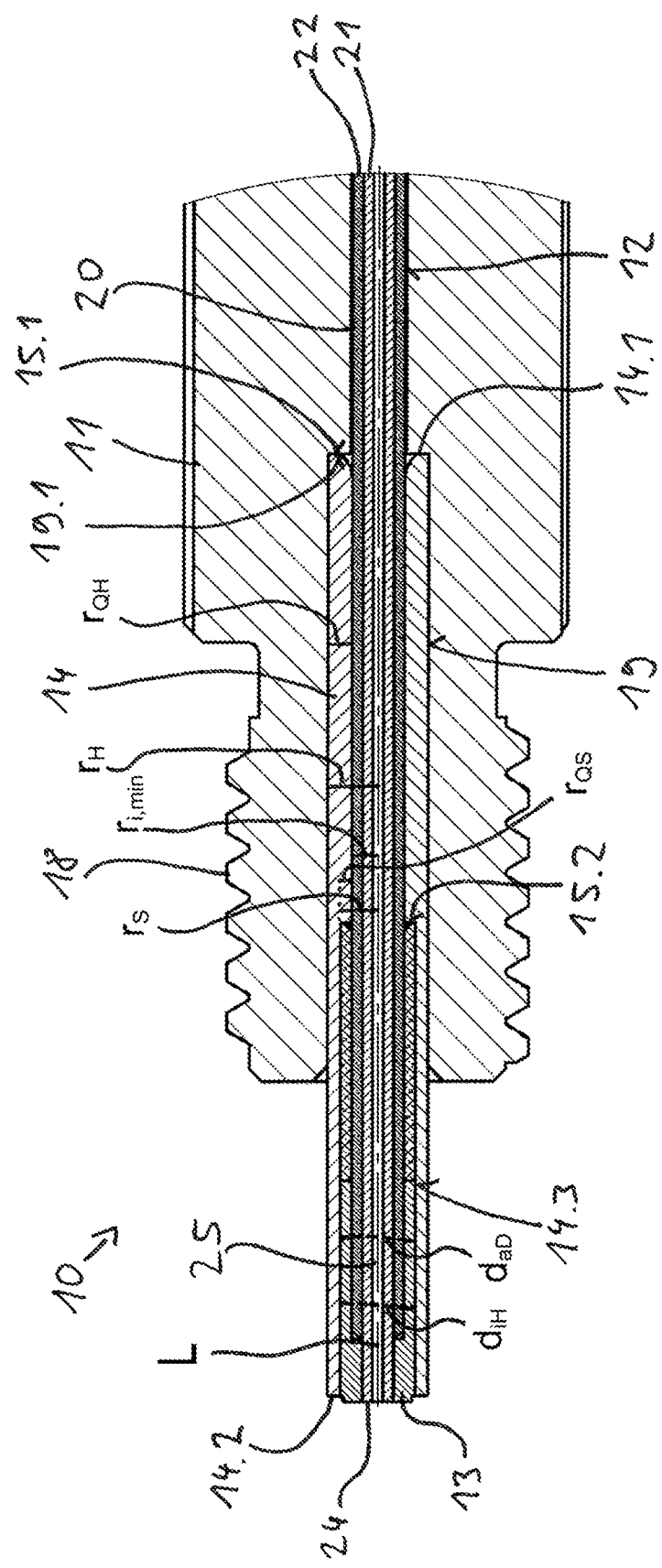
FIG. 4: a detailed view of the capillary connection unit according to marking IV from FIG. 2.
Figure 5:
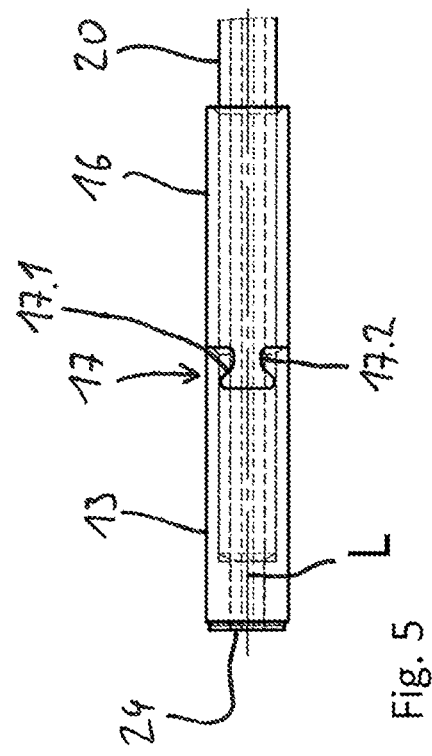
FIG. 5: a detailed view of the sealing element and the securing element of the capillary connection unit from FIG. 1.

FIGS. 1 to 6 show a first capillary connection unit 10 according to the invention. The capillary connection unit 10 comprises a connection element 11 which has an actuating section 11.1 and a thread 18, the connection element 11 having an axial guide-through 12 for a capillary 20. The connection element 11 is arranged on an end section 23 of a capillary 20 and is guided movably on the capillary 20. Furthermore, the connection element 11 is also freely rotatable in relation to the capillary 20, the capillary 20 forming the axis of rotation. The movability of the connection element 11 on the capillary 20 is limited by a stop element 26 fixedly connected to the capillary 20.

In the region of a free end 24 of the capillary 20, a sealing element 13 made of an elastic material, in particular an elastic plastic material, in particular a thermoplastic, such as one or more materials of the group comprising fluoroplastics, polyaryl ether ketones (PAEK), mixtures of fluoroplastics and polyaryl ether ketones (PAEK), in particular selected from the group comprising polytetrafluoroethylene (PTFE), polyvinylidene fluoride (PVDF), polyether ketone (PEK), polyether ether ketone (PEEK), polyether ketone ketone (PEKK), polyether ether ether ketone (PEEEK), polyether ketone ether ketone ketone (PEKEKK), and polyether ether ketone ether ketone (PEEKEK), preferably polyether ketone (PEK), polyether ether ketone (PEEK) and polyether ketone ketone (PEKK), and most preferably polyether ether ketone (PEEK), is circumferentially disposed around the capillary 20 and firmly connected to the capillary 20 in a bonded or material manner. The capillary 20 is in this case of a two-shell design and has an inner capillary or first shell 21 and an outer capillary or second shell 22 which are connected to one another (for example, in a bonded or force-fit manner), the inner capillary being formed, for example, from a thermoplastic, glass or fused silica, metal, such as stainless steel or titanium, or ceramic. The outer capillary or second shell 22 is, for example, formed as stainless steel or titanium tube, which is connected to the inner capillary in a force-fit or bonded (material) manner. Alternatively, the second shell 22 could also be formed from a thermoplastic.

Possibilities as thermoplastics for the capillary shells are, as with the sealing element 13, one or more materials of the group comprising fluoroplastics, polyaryl ether ketones (PAEK), mixtures of fluoroplastics and polyaryl ether ketones (PAEK), in particular selected from the group comprising polytetrafluoroethylene (PTFE), polyvinylidene fluoride (PVDF), polyether ketone (PEK), polyether ether ketone (PEEK), polyether ketone ketone (PEKK), polyether ether ether ketone (PEEEK), polyether ketone ether ketone ketone (PEKEKK), and polyether ether ketone ether ketone (PEEKEK), preferably polyether ketone (PEK), polyether ether ketone (PEEK) and polyether ketone ketone (PEKK).

Full or partial ceramics can be used as ceramic. The ceramic may consist of one or more materials selected from the group comprising carbides, nitrides and/or oxides (or others), or be a ceramic of one or more elements selected from the group consisting of boron, aluminum, silicon, germanium, zirconium, cerium, rare earths (or others). The ceramic material is preferably selected from the group consisting of silicon carbide, silicon nitride, silicon oxide, zirconium oxide, zirconium carbide, titanium oxide, aluminum oxide, titanium carbide and composites and/or mixtures thereof.

Fused silica is understood to mean silica glass (pure silicon dioxide) which is obtained by melting quartz (crystalline silicon dioxide) at temperatures above 1705° C. with subsequent cooling. The cooled melt is amorphous, i.e., unstructured. By maintaining certain temperatures, silica glasses having high transparency and very few OH groups can be generated—the latter is advantageous, if an adsorption of certain molecules on the surface is undesirable, e.g., in GC and HPLC applications.

The high chemical inertness, the high temperature resistance and the transparency as well as the fact that extremely thin capillaries can be made of fused silica are extremely advantageous.

In the present embodiment of the capillary connection unit 10, the inner capillary 21 projects toward the free end 24 of the capillary 20 beyond the outer capillary 22, e.g., by a few tenths of a millimeter up to several millimeters. In this end region, the sealing element 13 is directly connected to the inner capillary 21 in a bonded (material) manner at the free end 24 of the capillary 20. In the rear region, the sealing element 13 is also connected to the outer capillary 22 in a bonded (material) manner, e.g., glued or welded. In the axial direction of a longitudinal axis L of the capillary connection unit 10 away from the free end 24 of the capillary 20, a securing element 16 in the form of a metal sleeve, which is firmly connected to the outer capillary 22, adjoins the sealing element 13. The firm connection of the, for example, metal outer capillary 22 and the securing element 16 made of metal takes place, for example, by welding or soldering or by gluing the two parts to each other. At least one tooth 17.1 is formed on the securing element 16 and forms a toothed feature 17 together with counter teeth of the sealing element, wherein the toothed feature 17.1 forms undercuts 17.2 on the securing element 16 in order to produce a form-fitting mechanical connection with the sealing element 13 in addition to a good bonded connection with the sealing element 13. A rotational securing of the sealing element 13 in relation to the capillary 20 is produced via the securing element 16.

The capillary connection unit 10 also has a metal sleeve element 14, which radially externally surrounds the sealing element 13 at least in regions and which is circular cylindrical. The metal sleeve element 14 has a first end 14.1 facing the connection element 11 and a second end 14.2 facing away from the connection element 11. Starting from its second end 14.2, the sleeve element 14 has a circular cylindrical receiving region 14.3 for the sealing element 13 and the securing element 16, said receiving region facing away from the connection element 11. An inner diameter $d_{iH}$ of the sleeve element 14 in the receiving region 14.3 is at least as large as the outer diameter d of the sealing element 13 so that the sealing element 13 and the securing element 16, which has the same outer diameter as the sealing element 13, can be moved easily into the receiving region 14.3 of the sleeve element. At the same time, however, the inner diameter $d_{iH}$ of the sleeve element 14 in the receiving region 14.3 is at most 5/100 mm larger than the outer diameter d of the sealing element 13 so that the sealing element 13 when compressed can abut against the sleeve element 14 in a sealing manner. The sleeve element 14 is guided axially movably both in relation to the connection element 11 and in relation to the capillary 20 and thus likewise in relation to the sealing element 13. The connection element 11 is rotatable relatively to the sleeve element 14. The securing element 16 may be fully inserted into the receiving region 14.3, as FIGS. 1, 2, 3, 4 and 6 show. The sealing element 13 may also be substantially completely inserted into the receiving region 14.3, wherein "substantially" means that optionally some hundredths of a millimeter of the sealing element 13 can still project beyond the second end 14.2 of the sleeve element 14.

Figure 6:
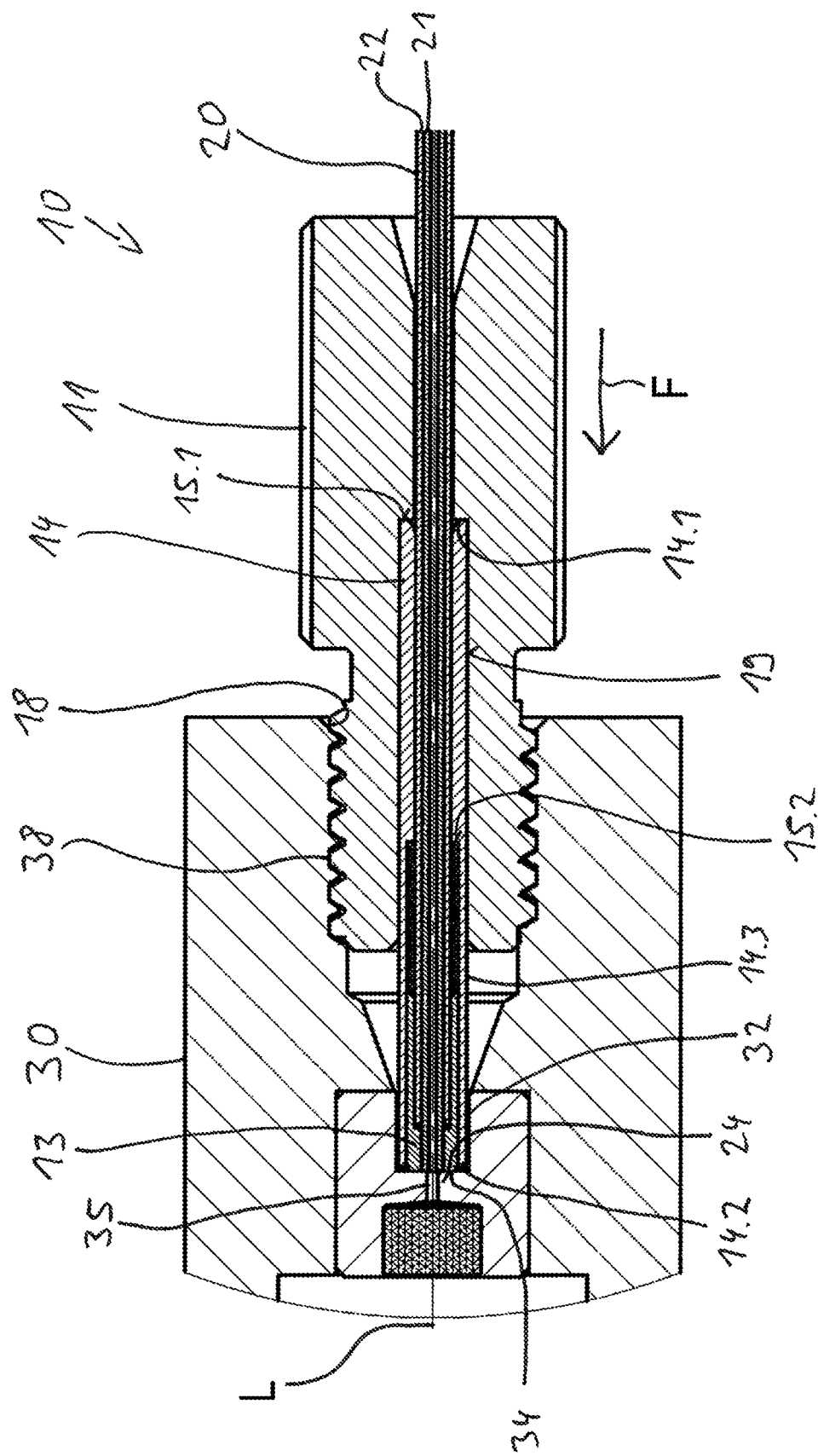
FIG. 6: the capillary connection unit in longitudinal section in a state connected to a counter element.
Figures 7, 8:
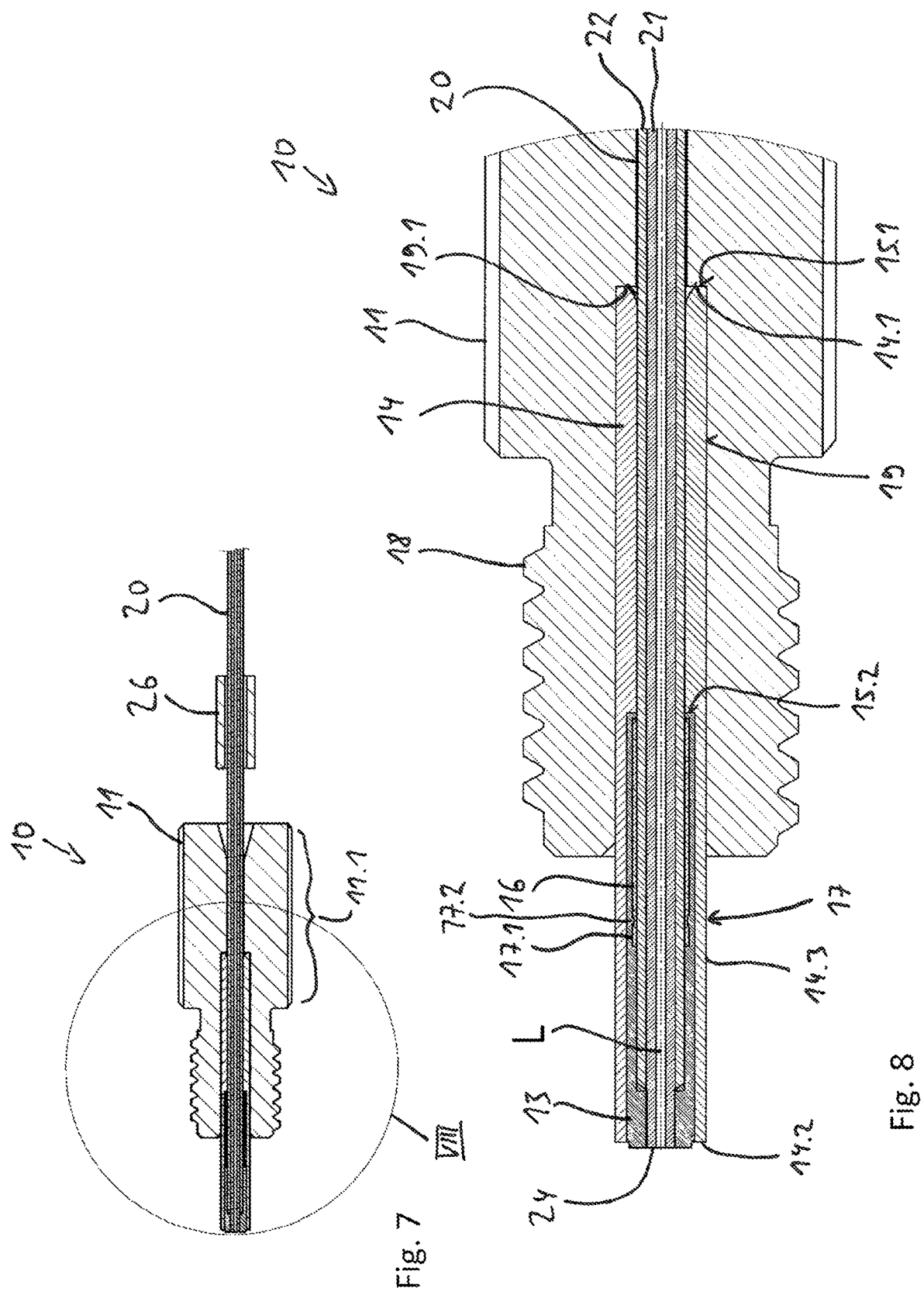
FIG. 7: a further capillary connection unit according to the invention in longitudinal section.
FIG. 8: a detailed view of the capillary connection unit according to marking VIII from FIG. 7.
Figure 9:
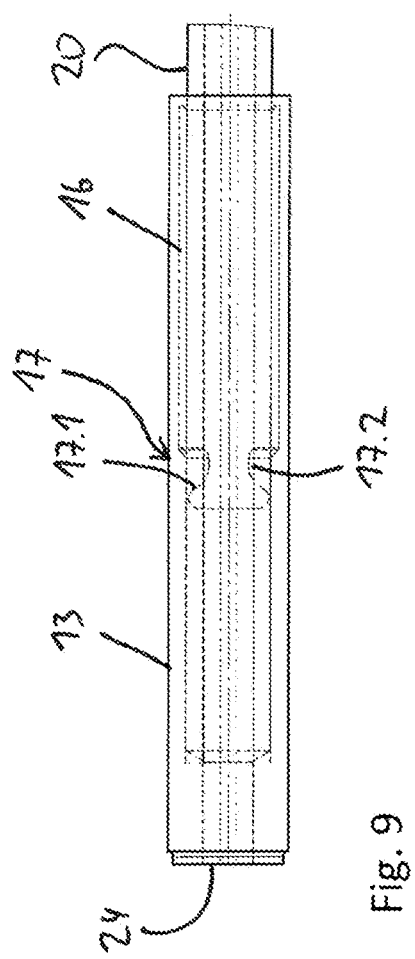
FIG. 9: a detailed view of the sealing element and the securing element of the capillary connection unit from FIG. 7.
Figure 10:
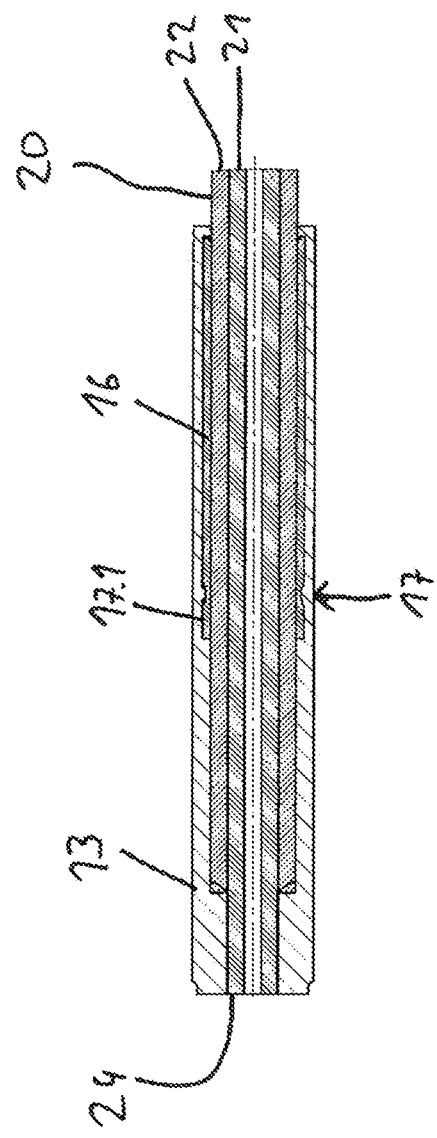
FIG. 10: a detailed view of the sealing element and the securing element of the capillary connection unit from FIG. 7 in longitudinal section.

In the present case, the connection element 11 also has a circular cylindrical receptacle in the form of a blind hole 19. The sleeve element 14 can be accommodated at least partially in the blind hole 19 or the receptacle in the connection element 11. It then rests with its first end 14.1 facing the connection element 11 against a stop face 19.1 of the connection element 11. The first end 14.1 of the sleeve element 14 has a first thrust surface 15.1 onto which a thrust force F can be transmitted from the stop face 19.1 to the sleeve element 14 when the capillary connection unit 10 is screwed into a counter element 30 as shown in FIG. 6 to produce a fluid connection between the counter element 30 and the capillary connection unit 10. In order to produce such a threaded connection, the counter element 30 has a counter thread 38 which can be brought into engagement with the thread 18 of the connection element 11.

The sleeve element 14 also has a radially internal second thrust surface 15.2, which is axially spaced from the second end 14.2 facing away from the connection element 11. The thrust force F, which is exerted on the sleeve element 14 by the connection element 11 when it is screwed into the counter element 30, can be transmitted onward to the sealing element 13 via this thrust surface 15.2. In the present embodiment, this onward transmission takes place in a mediated manner via the securing element 16 which is interlocked with the sealing element 13. Due to the thrust force F of the connection element 11 transmitted to the sealing element 13, the connection element is pressed against a sealing surface 34 in the receiving space 32 of the counter element 30 when the capillary connection unit 10 is screwed into the counter element 30, wherein any displaced material of the sealing element 30 is pressed into the receiving region 14.3 in the sleeve element 14. Dead water spaces in the contact area of the capillary 20 with the capillary channel 25 to the channel 35 of the counter element 30 are reliably avoided. Furthermore, the seal 13 can be pressed with high force against the sealing surface 34 of the counter element 30 so that even fluids conducted at high pressure can be reliably transferred from the capillary connection unit 10 to the counter element 30 and the channel 35 there.

A cross-section radius $r_{QS}=r_S-r_{i,min}$ of the second thrust 15.2 and a maximum cross-section radius $r_{QH}=r_H-r_{i,min}$ of the sleeve element 14 are at least in a ratio $r_{QH}:r_{QS}$ of 1.5:1. In this case, $r_{i,min}$ is the minimum inner radius of the sleeve element 14, $r_S$ is the outer radius of the second thrust surface 15.2 and $r_H$ is the outer radius of the sleeve element 14 (see FIG. 4).

FIGS. 7 to 10 show another embodiment of a capillary connection unit 10 according to the invention. This differs from the capillary connection unit described above according to FIGS. 1 to 6 in that the sealing element 13 is not only interlocked with the securing element 16 (see toothed feature 17 in FIGS. 8 to 10) but also in that the sealing element 13 completely surrounds the securing element 16 along its axial length so that the sealing element 13 with its end located in the receiving space 14.3 of the sleeve element 14 or its end face located there, lies against the second thrust surface 15.2 of the metal sleeve element 14. Otherwise, the embodiment shown here of the capillary connection unit 10 corresponds to the above-described capillary connection unit 10 according to FIGS. 1 to 6, so that reference is made with respect to reference symbols and features not mentioned here to the full extent to the foregoing description regarding FIGS. 1 to 6.

Figures 11, 12:
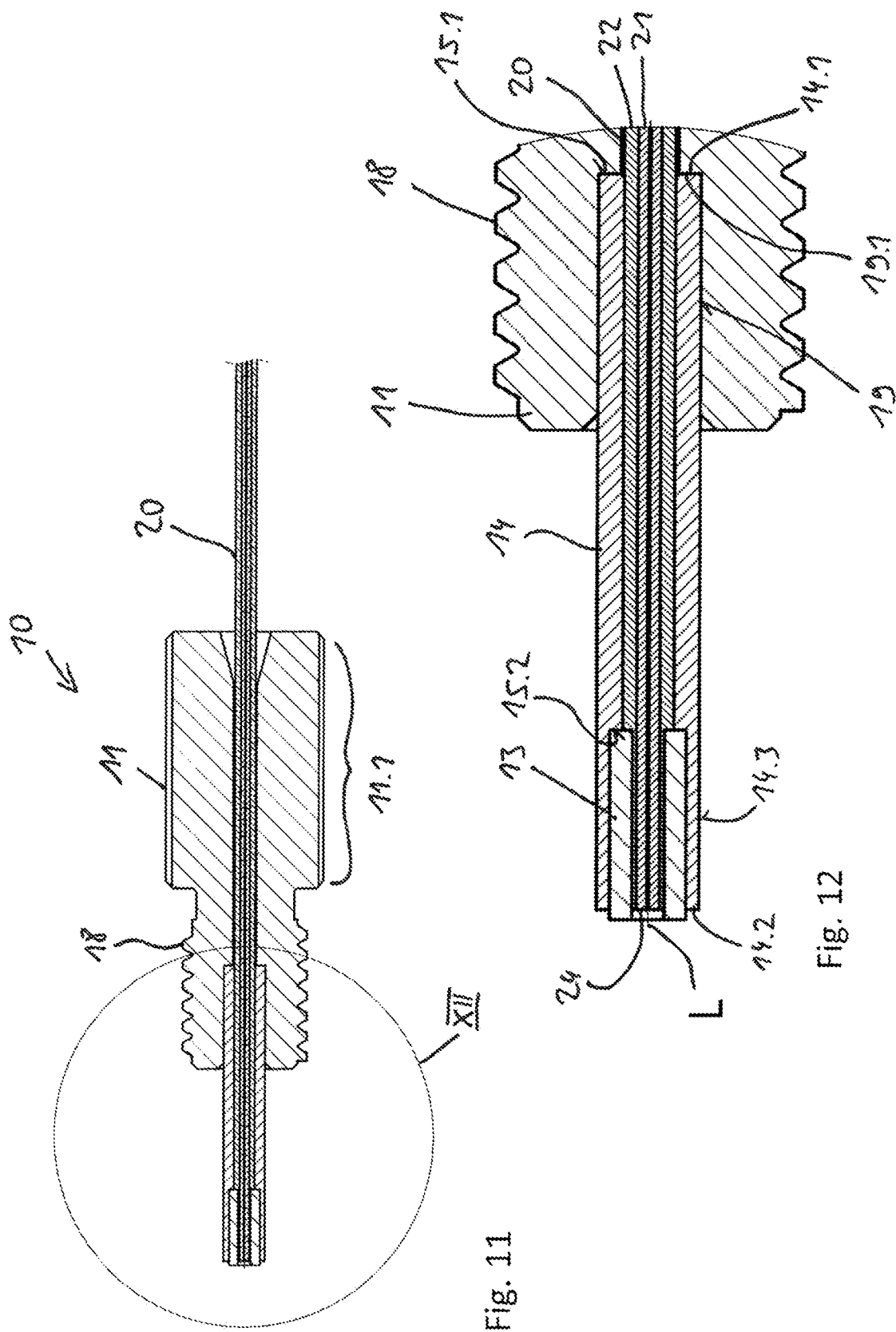
FIG. 11: a further capillary connection unit according to the invention in longitudinal section.
FIG. 12: a detailed view of the capillary connection unit according to marking XII from FIG. 11.

FIGS. 11 and 12 show a further embodiment of a capillary connection unit 10 according to the invention. This differs from the embodiment of a capillary connection unit 10 shown in FIGS. 1 to 6 in that the inner capillary or first shell 21 of the capillary 20 is formed as a glass capillary, while the outer capillary or second shell 22 of the capillary 20 is formed from a thermoplastic, e.g., PEEK. Furthermore, in this embodiment of a capillary connection unit 10, only one sealing element 13 and no additional securing element is arranged in the receiving space 14.3 of the metal sleeve element 14. This sealing element 13 made of a thermoplastic material, e.g., PEEK, is connected to the outer capillary 22 made of the thermoplastic material, such as PEEK, in a bonded manner, e.g., welded thereto over the entire surface. As with the embodiment according to FIGS. 1 to 6 and the embodiment according to FIGS. 7 to 10, the sleeve element 14 is also axially movable in relation to the connection element 11 and the sealing element 13 with the capillary 20 is axially movable in relation to the sleeve element 14. Furthermore, the embodiment shown here corresponds to the embodiment according to FIGS. 1 to 6, the description of which regarding reference symbols and features not mentioned here is referenced to the full extent.

FIGS. 13 and 14 show another embodiment of a capillary connection unit 10 according to the invention. This differs from the capillary connection unit shown in FIGS. 1 to 6 in that the capillary 20 is not multi-shelled and consists of only one material. In this case, the capillary is entirely formed from stainless steel, but it could alternatively be made from a thermoplastic, e.g., PEEK, or from glass. The sealing element 13 in this case consists of a thermoplastic, e.g., PEEK, and is in turn interlocked with the securing element 16 by means of the toothed feature 17, as is the case in the embodiment according to FIGS. 1 to 6. With respect to further reference symbols and features of this embodiment of the capillary connection unit 10 not mentioned here, reference is made to the full extent to the foregoing description regarding the embodiment according to FIGS. 1 to 6.

FIGS. 15 and 16 show a further embodiment of a capillary connection unit 10 according to the invention, which differs from the embodiment illustrated in FIGS. 11 and 12 in that the sleeve element 14 is not accommodated in a blind hole of the connection element 11 but that the sleeve element 14 has a radially circumferential flange-like widening 14.4 facing the connection element 11, whereby a large-area first thrust surface 15.1 is produced on the sleeve element 14. Said first thrust surface can be brought into contact over a large area with the stop face 19.1 of the connection element 11, wherein the stop face 19.1 in this embodiment of the capillary connection unit 10 is formed by an end face of the connection element 11. The capillary 20 in this embodiment is of two-shell construction and in turn has an inner capillary made of glass, a thermoplastic, e.g., PEEK, or metal, e.g., stainless steel or titanium. The outer capillary 22 is formed from a thermoplastic, e.g., from PEEK, wherein the sealing element 13, which also consists of a thermoplastic, e.g., PEEK, is connected to the outer capillary 22 in a bonded manner, e.g., welded thereto. The capillary 20 with the sealing element 13 arranged thereon is in turn movable (to a limited extent) in relation to the sleeve element 14 and the sleeve element 14 is (movable) to a limited extent in relation to the connection element 11. It is to be noted that instead of a multi-shelled capillary, a single-shell capillary, for example of a thermoplastic, such as PEEK, glass, metal, e.g., stainless steel or titanium, or one of the ceramics described above, can also be used in this embodiment.

For further reference symbols and features not explicitly mentioned here, reference is made to the preceding description relating to FIGS. 1 to 6 and 11 to 12.

LIST OF REFERENCE SYMBOLS

10 Capillary connection unit
11 Connection element
11.1 Actuating sections
12 Axial guide-through
13 Sealing element
14 Metal sleeve element
14.1 First end
14.2 Second end
14.3 Receiving region (for the sealing element)
14.4 Flange-like widening
15.1 First thrust surface
15.2 Second thrust surface
16 Securing element
17 Toothed feature
17.1 Teeth
17.2 Undercuts
18 Thread
19 Blind hole
19.1 Stop face
20 Capillary
21 First shell (inner capillary)
22 Second shell (outer capillary)
23 End section
24 Free end
25 Capillary channel
26 Stop element
30 Counter element
32 Receiving space
34 Sealing surface
35 Channel
38 Counter thread
F Thrust force
L Longitudinal axis (of the capillary connection unit)

The invention claimed is:

1. Capillary connection unit for analysis devices and medical devices, comprising:
    a capillary having at least one end section and a free end thereon;
    at least one connection element arranged on the end section of the capillary, wherein the connection element has an axial guide-through through which the capillary runs;
    a sealing element surrounding the capillary at least in the region of its free end;
    a metal sleeve element which radially externally surrounds the sealing element at least in regions and which has a first end facing the connection element and a receiving region facing away from the connection element;
    the connection element with the free end of the capillary being configured to be detachably connected to a counter element and to exert an axial thrust force onto the sealing element;
    the sleeve element being, in use, simultaneously axially slidable in relation to both the connection element and the conjoined capillary with the sealing element;
    an inner diameter diH of the sleeve element in the receiving region facing away from the connection element being at least as large as the outer diameter daD of the sealing element, the sleeve element being configured to substantially completely accommodate the sealing element in its receiving region; and
    the sleeve element having at its first end facing the connection element a first thrust surface facing the connection element in the axial direction for receiving the thrust force of the connection element and a second thrust surface located exclusively radially internally of the sleeve element, which is axially spaced from a second end facing away from the connection element and faces the sealing element, for forwarding the thrust force to the sealing element.

2. Capillary connection unit according to claim 1, wherein the capillary connection unit does not have any tubular capillary insert having an annular end at the end of the capillary.

3. Capillary connection unit according to claim 1, wherein the sealing element is firmly connected to the capillary in a bonded manner.

4. Capillary connection unit according to claim 1, wherein the sealing element is formed from at least one material of the group comprising fluoroplastics, polyaryl ether ketones (PAEK), mixtures of fluoroplastics and polyaryl ether ketones (PAEK).

5. Capillary connection unit according to claim 1, wherein the second thrust surface is formed as an annular surface, wherein a cross-section radius $r_{QS}=r_S-r_{i,min}$ of the second thrust surface and a maximum cross-section radius $r_{QH}=r_H-r_{i,min}$ of the sleeve element are at least in the ratio $r_{QH}:r_{QS}$ of 1.5:1 and where $r_{i,min}$ is the minimum inner radius of the sleeve element, $r_S$ is the outer radius of the second thrust surface and $r_H$ is the outer radius of the sleeve element.

6. Capillary connection unit according to claim 1, wherein the capillary is multi-shelled, preferably two-shelled, at least in the end section of the capillary.

7. Capillary connection unit according to claim 6, wherein a first, inner shell of the capillary is formed from a material of the group comprising glass including fused silica, a thermoplastic material, metal, ceramic and that a second, outer shell is formed from a material of the group comprising a thermoplastic material, metal, ceramic.

8. Capillary connection unit according to claim 1, wherein a stationary securing element is arranged radially externally on the capillary in a region directly adjacent to the sealing element to the connection element and is connected to the capillary in a bonded manner and is connected to the sealing element in a bonded and formfitting manner via a toothed feature.

9. Capillary connection unit according to claim 8, wherein the stationary securing element is made of metal, including steel, and is of annular or sleeve-shaped design and encloses the capillary in regions.

10. Capillary connection unit according to claim 8, wherein the radially internal second thrust surface of the sleeve element interacts in a mediated manner via the stationary sleeve element with the sealing element in order to transmit the thrust force of the connection element.

11. Capillary connection unit according to claim 1, wherein the connection element is movably guided to a limited extent on the capillary, wherein the movability of the connection element on the capillary is limited by a stop element fixedly connected to the capillary.

12. Capillary connection unit according to claim 4, wherein the sealing element is formed from the at least one material selected from the group comprising polytetrafluoroethylene (PTFE), polyvinylidene fluoride (PVDF), polyether ketone (PEK), polyether ether ketone (PEEK), polyether ketone ketone (PEKK), polyether ether ether ketone (PEEEK), polyether ketone ether ketone ketone (PEKEKK), and polyether ether ketone ether ketone (PEEKEK).

13. Capillary connection unit for analysis devices and medical devices, comprising:
  a capillary having at least one end section and a free end thereon;
  at least one connection element arranged on the end section of the capillary, wherein the connection element has an axial guide-through through which the capillary runs;
  a sealing element surrounding the capillary at least in the region of its free end;
  a metal sleeve element which radially externally surrounds the sealing element at least in regions and which has a first end facing the connection element and a receiving region facing away from the connection element;
  the connection element with the free end of the capillary being configured to be detachably connected to a counter element and to exert an axial thrust force onto the sealing element;
  the sleeve element being axially movably guided in relation to both the connection element and the capillary with the sealing element while the connection element is being connected to the counter element;
  an inner diameter diH of the sleeve element in the receiving region facing away from the connection element being at least as large as the outer diameter daD of the sealing element, the sleeve element being configured to substantially completely accommodate the sealing element in its receiving region; and
  the sleeve element having at its first end facing the connection element a first thrust surface facing the connection element in the axial direction for receiving the thrust force of the connection element and a second thrust surface located exclusively radially internally of the sleeve element, which is axially spaced from a second end facing away from the connection element and faces the sealing element, for forwarding the thrust force to the sealing element.

* * * * *